BINARY DIGIT DISCRIMINATOR

Filed July 8, 1964

INVENTOR
SUNG PAL CHUR
BY Samuel Lindenberg
Arthur Frederick
ATTORNEYS

Oct. 1, 1968 S. P. CHUR 3,404,391
BINARY DIGIT DISCRIMINATOR
Filed July 8, 1964 2 Sheets-Sheet 2

INVENTOR
SUNG PAL CHUR
BY Samuel Lindenberg
Arthur Freilich
ATTORNEYS

United States Patent Office 3,404,391

Patented Oct. 1, 1968

3,404,391

BINARY DIGIT DISCRIMINATOR

Sung Pal Chur, Inglewood, Calif., assignor to Data Products Corporation, Culver City, Calif., a corporation of Delaware Filed July 8, 1964, Ser. No. 381,121
6 Claims. (Cl. 340—174.1)

ABSTRACT OF THE DISCLOSURE

An apparatus for discriminating between binary digits recorded in accordance with a Gabor code. Discrimination is achieved by comparing the plurality of signal spikes spaced by a bit interval, rather than by detecting whether or not a spike occurs within a bit interval. The apparatus includes a flip-flip which is set in response to a first polarity voltage spike and is reset in response to a second polarity voltage spike. A multivibrator responds to either polarity voltage spike by switching to an unstable state. Voltage spikes developed while the multivibrator is in its unstable state are inhibited from having any effect on the flip-flop.

Figure 1:
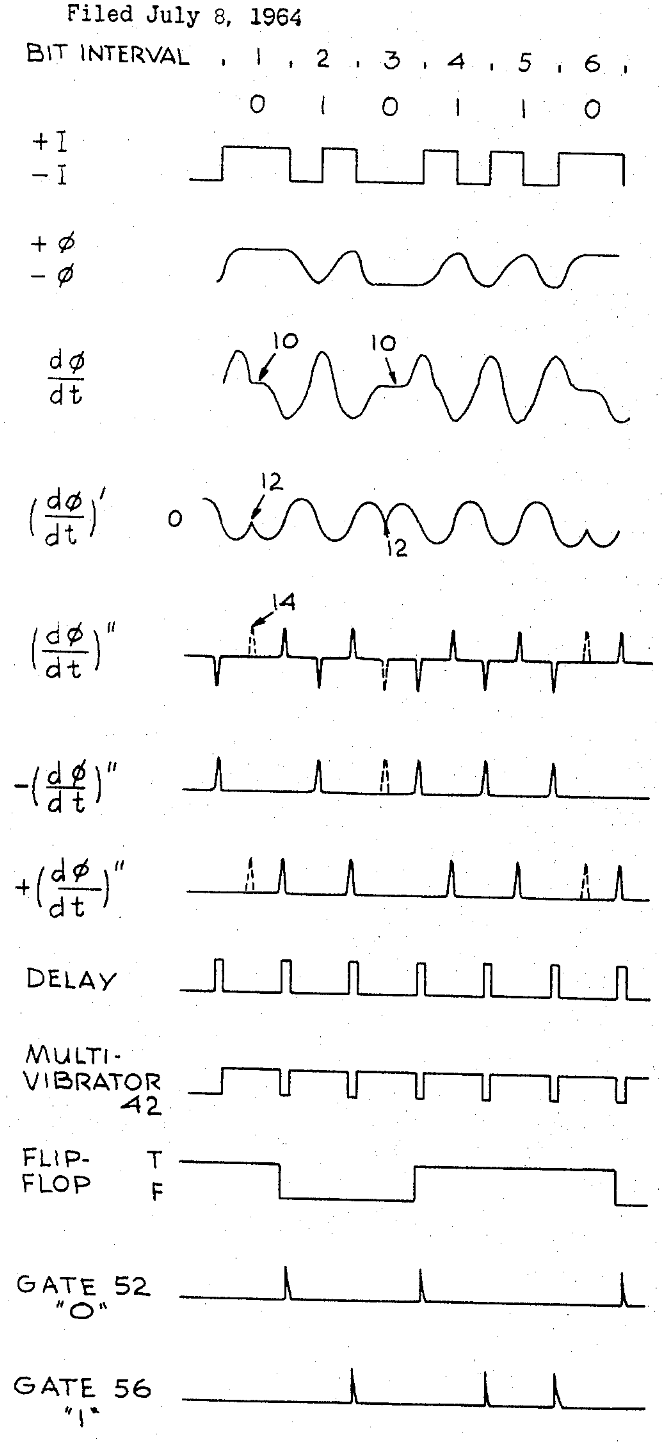

This invention relates generally to magnetic recording and reproducing apparatus and more particularly to a method and apparatus for reading and discriminating between recorded binary digits.

Great use is made of moving magnetic media for storing binary information in data processing systems. Many different recording techniques are known for respectively representing binary "0" and "1" digits and each technique is of course characterized by certain seemingly inherent advantages and disadvantages. One popular recording technique (sometimes referred to as a "Gabor" code) involves representing a "0" by orienting the magnetic flux in a bit area of the recording surface all in one direction and representing a "1" by providing a flux transition in the center of a bit area by orienting the flux in different halves of the area in opposite directions. Flux transitions can always be provided between adjacent bit areas regardless of whether they store "1's" or "0's."

In order to read information recorded in this manner and discriminate "0's" from "1's" it is conventional practice to develop voltage spikes, as by differentiation, coincident with each flux transition and use each spike to set a monostable multivibrator for a period just less than a bit interval. A gate is enabled during the period the multivibrator is set and any spike developed during this period will be passed by the gate and interpreted as representing a "1." It is of course important that the multivibrator be set on the initial spike of each bit interval rather than on a mid-bit spike. If the multivibrator is initially erroneously set by a mid-bit spike however, it will automatically synchronize itself on the first "0" bit.

Although this discrimination technique is satisfactory where the recording density is suitably high and where the bandwidth limits of the amplifiers and differentiator circuitry are approached, certain problems arise where these conditions are not met. Thus, for example, where a shoulder exists between a pair of peaks in the output voltage waveform read from the recording medium, it can, after differentiation, cause the development of a false spike inasmuch as its slope often approaches zero. Since this spike would normally occur during the period the gate is open, it could falsely be interpreted as representing a "1." Moreover, even if the slope of the shoulder is not quite zero, a relatively small noise transient may be sufficient to degrade the output voltage waveform slope to zero in the shoulder region.

In view of the above, it is an object of the present invention to provide a improved method and apparatus for discriminating between recorded binary digits.

Briefly, the present invention is based on the recognition that the introduction of errors of the above-described type can be avoided by comparing the polarity of signal spikes spaced by a bit interval rather than by detecting whether or not a spike occurs within the interval. More particularly, inasmuch as the flux transitions at the first and second ends of a bit area storing a "0" are in opposite directions and the flux transitions at the first and second ends of a bit area storing a "1" are in the same direction, a stored bit can be recognized without regard to what the output waveform looks like between these ends. Thus, any problems arising from the presence of a shoulder portion are avoided.

In a preferred embodiment of the present invention, a bistable device, e.g., a flip-flop, and a monostable multivibrator having a period equal to just less than a bit interval are provided. When the multivibrator is in its stable state, a first polarity voltage spike will set the flip-flop and a second polarity voltage spike will reset the flip-flop. Either polarity voltage spike will switch the multivibrator to its unstable state. Voltage spikes developed while the multivibrator is in its unstable state are inhibited from having any effect. Thus, whenever the flip-flop changes state, it indicates that a "0" was read during the previous bit interval.

Figure 2:
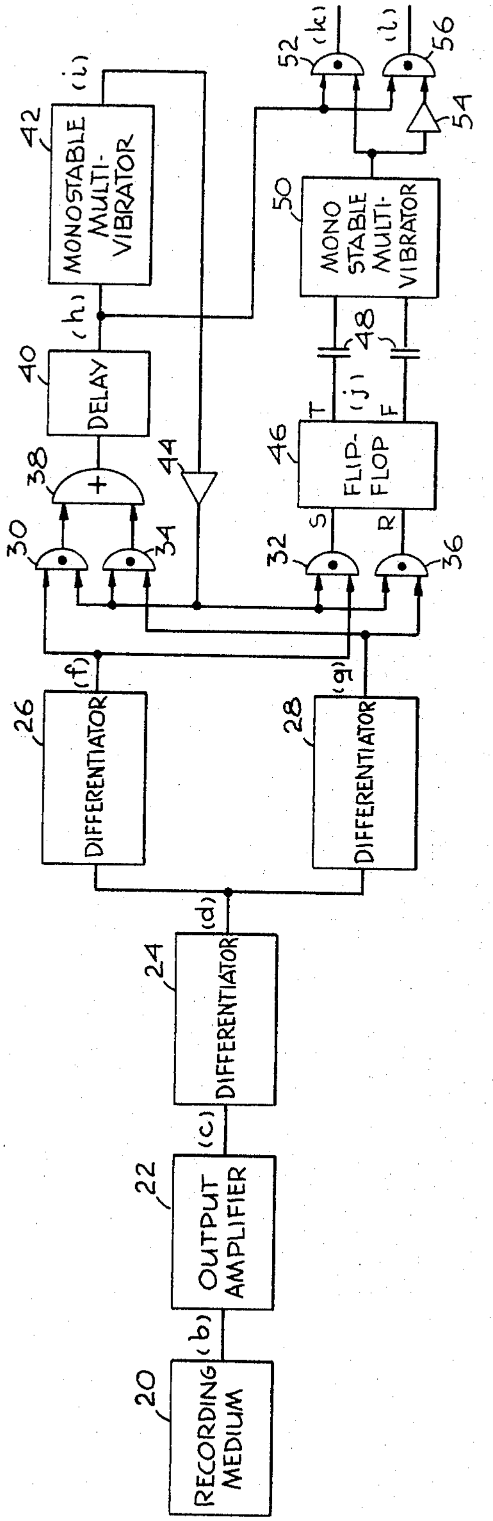

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 constitutes a waveform chart illustrating various waveforms encountered in the recording and reproducing of binary digits both in accordance with the prior art and the present invention; and FIGURE 2 is a logical block diagram of a discriminator apparatus constructed in accordance with the present invention.

Attention is now called to FIGURE 1 of the drawings which illustrates various waveforms encountered in the recording and reproducing of the arbitrarily chosen bit sequence of "0", "1," "0," "1," "1," "0" in accordance with an aforementioned "Gabor" code. In accordance with this code, a "0" is represented by oppositely directed signal transitions at the first and second ends of a bit interval while a "1" is represented by a signal having a mid-bit transition and thus similarly directed transitions at the ends of the bit interval. Line (a) of FIGURE 1 represents a drive current for recording the arbitrarily chosen bit sequence. Thus, note that during bit interval one, the current increases from $-I$ to $+I$, remaining at $+I$ throughout the interval. A current transition occurs at the beginning of bit interval two and inasmuch as a "1" is represented in this interval, another transition occurs at the center thereof. At the beginning of bit interval three, a current transition again occurs but inasmuch as a "0" is represented during this interval, no mid-bit transition occurs. Line (b) of FIGURE 1 indicates generally the flux orientation on the recording surface resulting from the application of the writing current of Line (a). The output voltage waveform derived from a conventional read head is illustrated in Line (c).

As noted, it is conventional practice to discriminate between the digits represented by the waveform of Line (c) by developing voltage spikes coincident with the peaks of the waveform and utilizing these peaks to open a gate for a period just less than a bit interval. If an additional voltage spike occurs during this period, then a "1" is indicated. On the other hand, if no additional spike occurs, then a "0" is indicated.

The voltage spikes coincident with the peaks of the waveform of Line (c) are normally developed by a double differentiation process. Thus, the waveform of Line (c) is initially differentiated to provide the waveform of Line (c) which has zero crossover points coincident with the peaks of the waveform of Line (c). Differentiation of the waveform of Line (d) provides the waveform of Line (e) in which the solid line spikes are coincident with the zero crossover points of the Line (d) waveform which zero crossover points are in turn coincident with the peaks of the Line (c) waveform.

Where the packing density on the recording medium is not sufficiently high or where the frequency of the Line (c) waveform does not approach the bandwidth limits of the amplifiers, shoulder portions 10 are often defined in the Line (c) waveform. Inasmuch as these shoulder portions often have a slope close to zero, they are responsible for establishing additional zero crossover points 12 in the waveform of Line (d). Even if the slope of the shoulder portion is not quite zero, it is often sufficiently close such that the simultaneous occurrence of noise can effectively degrade the slope of the waveform of Line (c) in these areas to zero. The presence of these zero crossover points 12 in turn cause the erroneous development of voltage spikes 14, illustrated in dotted lines, in the waveform of Line (e). Utilizing conventional discrimination techniques, it should be apparent that these voltage spikes 14 can cause "1's" to be erroneously read in lieu of "0's." More particularly, assume that the first voltage spike of the Line (e) waveform sets a monostable multivibrator which then opens a gate for a period which ends just prior to the spike expected at the beginning of the second bit interval. This gate will pass the false spike 14 thus indicating a "1."

In accordance with the invention, in order to avoid false readings of the above-described type, apparatus is provided for looking at the polarity of the voltage spikes occurring at first and second ends of a bit interval rather than detecting during that interval. Thus, still considering the waveform of Line (e), it should be apparent that oppositely directed voltage spikes at the ends of a bit interval indicate a "0" while similarly directed voltage spikes at the ends of a bit interval indicate a "1." The apparatus of FIGURE 2 operates to examine the polarity of voltage spikes at the ends of bit intervals.

More particularly, in accordance with the invention, the recording medium 20 presents a flux signal represented by the waveform in Line (b) to an output amplifier 22 which in turn provides a voltage signal represented by the waveform of Line (c). The output signal from the amplifier 22 is applied to a differentiator circuit 24 which in turn provides a signal having the waveform shown in Line (d). This signal is applied to the input of complementary differentiator circuits 26 and 28 which respectively provide output signals represented by the waveforms of Lines (f) and (g). It is to be noted that the waveform of Line (f) consists of positive voltage spikes which are coincident with the negative spikes which would otherwise be developed by forming a signal having the waveform of Line (e). The Line (g) waveform consists only of the positive voltage spikes of the Line (e) waveform.

The output of the differentiator circuit 26 is connected to the input of And gates 30 and 32. The output of the differentiator circuit 28 is connected to the input of And gates 34 and 36. The outputs from gates 30 and 34 are connected to the input of an Or gate 38 whose output in turn is connected to the input of a delay circuit 40. The output of the delay circuit 40 is connected to the input of a monostable multivibrator 42 whose output in turn is connected through an inverter 44 to the input of And gates 30, 34, 32, and 36. As long as the multivibrator 42 defines a stable state, it presents a logically false output which is inverted by the inverter 44 to thus enable all of the previously mentioned And gates. On the other hand, when the multivibrator 42 is in an unstable state, it presents a logically true output to thus disable all of the And gates.

Assume initially, that the multivibrator 42 defines a stable state and that one of the differentiator circuits 26 or 28 provides an output voltage spike which is coupled through either gate 30 or 34 and through gate 38 to the delay circuit 40. In response to each voltage spike provided thereto, the delay circuit 40 provides a positive output pulse represented by the waveform shown in Line (h). The multivibrator 42 responds to the negative transition of the output of the delay circuit 40 by switching to its unstable state. The output signal waveform of the delay circuit is shown in Line (h), and the corresponding output of the multivibrator 42 is represented by the waveform of Line (i). When the output of the multivibrator 42 is in its high or unstable state it disables And gates 32 and 36 as previously noted.

And gates 32 and 36 are respectively connected to the set and reset input terminals of a bistable circuit or flip-flop 46. The true and false output terminals of the flip-flop 46 are AC coupled through differentiating capacitors 48 to the input of a second monostable multivibrator 50. When the multivibrator 42 is in its stable state, a voltage spike provided by the differentiator circuit 26 will set the flip-flop 46 while a voltage spike provided by the differentiator circuit 28 will reset the flip-flop 46. The occurrence of either of these spikes will however switch the multivibrator 42 to its unstable state, after the short delay introduced by delay circuit 40, to thus prevent further spikes appearing during that bit interval from affecting the flip-flop 46.

When the multivibrator 50 is in its stable state, it provides a false output signal. In response to a signal transition on either output terminal of flip-flop 46, the multivibrator 50 switches to a true state for a short interval. The output of the multivibrator is connected directly to the input of an And gate 52 and through an inverter 54 to the input of an And gate 56. The output of the delay circuit 40 is connected to the inputs of both And gates 52 and 56. Thus, the pulses provided by the delay circuit 40 are used to enable the gates 52 and 56 at the beginning of each bit interval. If the multivibrator 50 is concurrently in an unstable or true state the gate 52 will provide a positive output pulse represented by the waveform of Line (k) and conversely if the multivibrator 50 defines a stable or false state, the And gate 56 will provide a true output pulse represented by the waveform on Line (l).

Thus, it should be apparent that the flip-flop 46 is responsive to voltage spikes only spaced by a full bit interval and is non-responsive to any spikes, for example the dotted line spikes shown in Lines (f) and (g) occurring during the interval. If the flip-flop 46 switches at the end of a bit interval, then it necessarily means that a "0" was represented during that previous interval and on the other hand if no transition occurs at the output of the flip-flop 46, a "1" was necessarily represented during that previous interval. The multivibrator 50 will therefore switch to its unstable or true state only in response to "0's" and thus gate 52 will provide an output pulse to represent each detected "0" and gate 56 will provide an output pulse to represent each detected "1."

From the foregoing, it should be appreciated that a method and apparatus has been provided herein for discriminating between binary digits recorded in accordance with the aforedescribed code. By effectively looking at an output signal at the ends of bit intervals rather than during the bit interval, errors previously introduced by noise and other effects occurring during the interval are avoided. As a consequence, at a relatively small cost, considerably more accurate discrimination is achieved.

No mention has been made herein of a specific type of moving magnetic recording medium and it should thus be appreciated that the invention finds utility with all known recording media including discs, drums, and tapes.

What is claimed is:

1. In combination with means providing a signal having positive and negative transitions and wherein oppositely directed transitions spaced by a unit interval are representative of a first binary digit and similarly directed transitions spaced by a unit interval are representative of a second binary digit, discriminator means including a bistable device; means responsive to a positive signal transition for switching said bistable device to a first state; means responsive to a negative signal transition for switching said bistable device to a second state; and means responsive to either a positive or a negative signal transition for thereafter inhibiting switching of said bistable device for a period just less than said unit interval.

2. The combination of claim 1 including means responsive to said bistable device switching for indicating that said signal represented a first binary digit during the previous unit interval.

3. In combination with means providing a signal having positive and negative transitions and wherein oppositely directed transitions spaced by a unit interval are representative of a first binary digit and similarly directed transitions spaced by a unit interval are representative of a second binary digit, discriminator means including a bistable device; means responsive to a positive signal transition for switching said bistable device to a first state; means responsive to a negative signal transition for switching said bistable device to a second state; a monostable multivibrator having a period just less than said unit interval; means responsive to either a positive or a negative signal transition for switching said multivibrator to its unstable state; and means responsive to said multivibrator defining its unstable state for inhibiting said bistable device from switching.

4. In combination with means providing a signal having positive and negative transitions and wherein oppositely directed transitions spaced by a unit interval are representative of a first binary digit and similarly directed transitions spaced by a unit interval are representative of a second binary digit, discriminator means including a bistable device; means responsive to a positive signal transition for switching said bistable device to a first state; means responsive to a negative signal transition for switching said bistable device to a second state; means responsive to either positive or a negative signal transition for providing a delay pulse; a monostable multivibrator having a period just less than said unit interval; means responsive to the termination of said delay pulse for switching said multivibrator to its unstable state; and means responsive to said multivibrator defining its unstable state for inhibiting said bistable device from switching.

5. The combination of claim 4 including means responsive to said bistable device switching for indicating that said signal represented a first binary digit during the previous unit interval.

6. The combination of claim 5 wherein said means responsive to said bistable device switching includes a second monostable multivibrator and means for switching said second monostable multivibrator to an unstable state in response to said bistable device switching; first and second output gates; means for enabling said first and second output gates in response to said delay pulse; and means coupling said second monostable multivibrator to said first and second output gates for causing said first output gate to provide an output pulse in the event said second monostable multivibrator defines an unstable state concurrent with said delay pulse and for causing said second output gate to provide an output pulse in the event said second monostable multivibrator defines a stable state concurrent with said delay pulse.

References Cited

UNITED STATES PATENTS

| | | | |
|---|---|---|---|
| 3,164,815 | 1/1965 | Applequist | 340—174.1 |
| 3,243,580 | 3/1966 | Welsh | 340—174.1 |

BERNARD KONICK, *Primary Examiner.*

V. P. CANNEY, *Assistant Examiner.*